June 25, 1963     S. A. URSHAN     3,094,873
LIQUID LEVEL GAUGE
Filed Nov. 16, 1961
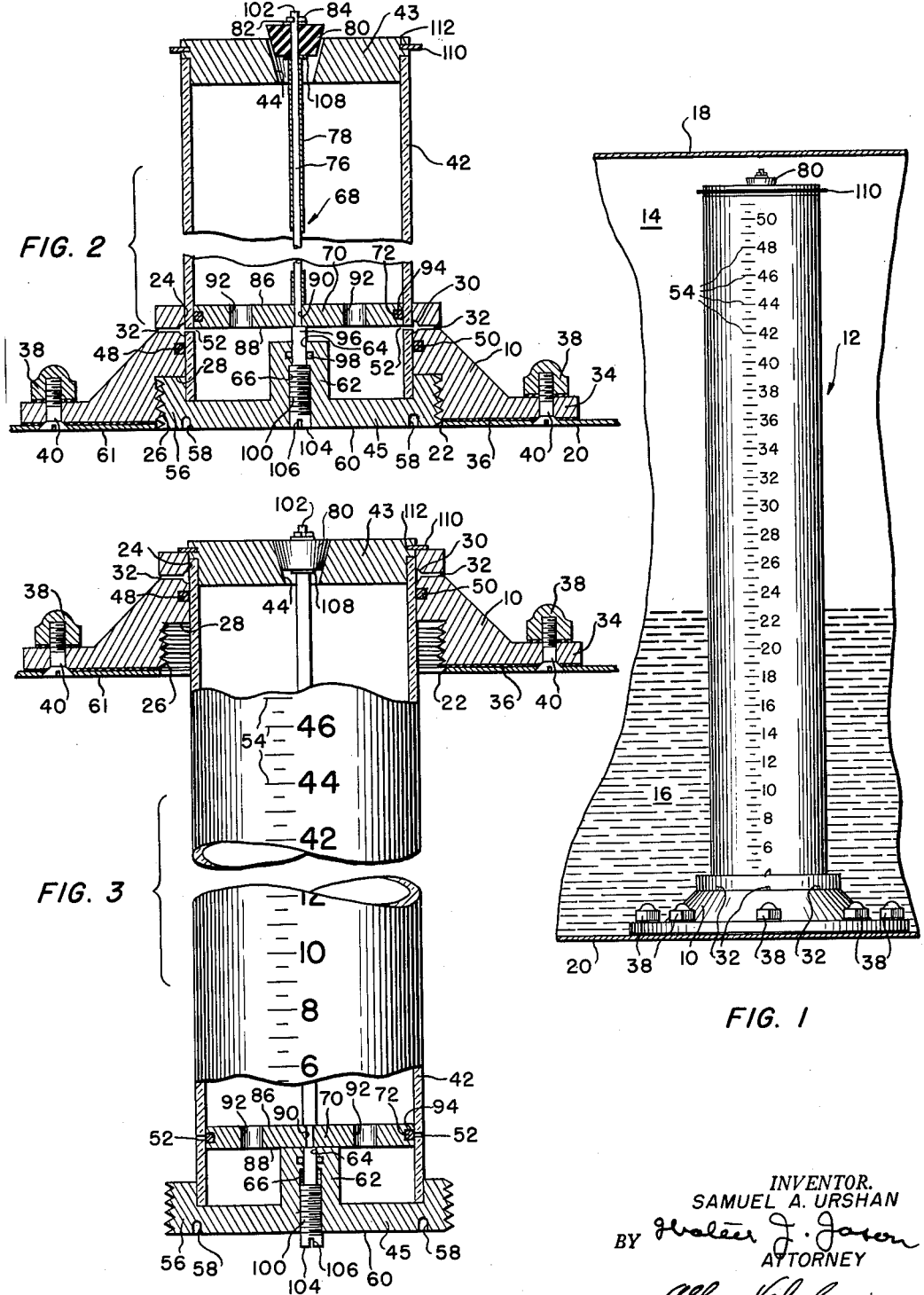
*INVENTOR.*
*SAMUEL A. URSHAN*
BY *Walter J. Jason*
         ATTORNEY
*Alfons Valukonis*
         AGENT

United States Patent Office 3,094,873
Patented June 25, 1963

3,094,873
LIQUID LEVEL GAUGE
Samuel A. Urshan, Santee, Calif., assignor to General Dynamics Corporation, San Diego, Calif., a corporation of Delaware
Filed Nov. 16, 1961, Ser. No. 152,849
8 Claims. (Cl. 73—290)

This invention relates generally to liquid level gauges, and more particularly to a gauge capable of providing determination of the liquid level in a tank or container from the underside thereof.

Heretofore certain devices installed in the fuel tanks of aircraft for withdrawal from the underside of a wing to provide a visual means for checking fuel quality presented certain disadvantages. One important disadvantage of such devices resided in that to take a measurement they had to be slowly withdrawn from the tank until fuel flowed out a drip hole near the base of the device resulting in a loss of fuel, and a contamination of the adjacent ground area with an inflammable substance. Another disadvantage is that the measurement procedure is complex and confusing. After the device is withdrawn to the position providing flow of fuel through the drip hole, the device then has to be pushed back again slowly into the tank until the fuel drip stops, and then slowly inched down again to obtain a fast drip of fuel. In this position the height of the top of the device above a calibration plane when compared to a conversion chart, which has to be consulted, indicates the quantity of fuel in the tank. Confusion also results in how to read the calibrations on the device, since the height of the device above the calibration plane has to be read from numerals which are hidden from view within the tank. These and other disadvantages are eliminated by the device of the present invention.

Accordingly, an object of the present invention is to provide novel gauge apparatus capable of providing easy and accurate measurement of the quantity of liquid in a container or tank.

Another object is to provide a novel liquid level gauge capable of visually indicating the level of liquid in a tank or container.

Still another object is to provide a novel gauge capable of providing a measurement of the liquid level in a container without the loss of liquid.

A further object is to provide a gauge embodying liquid level measuring means normally reposing in a tank, but capable of being withdrawn from the underside thereof to measure the level of liquid in the tank without loss of the liquid.

Still a further object of the present invention is the provision of a novel liquid level measuring gauge which can be mounted on the lower wall of a container or tank and when in a fully inserted position within the container presents an outer surface which is flush with the outer surface of the lower wall of the container.

These and other objects will be apparent from the following description and drawings in which:

FIGURE 1 is a fragmentary sectional view of a tank having a liquid therein and provided with the gauge of the present invention mounted on the lower wall of the tank and wherein the gauge is shown in elevation;

FIGURE 2 is an enlarged vertical sectional view through the gauge of the present invention; and FIGURE 3 is an enlarged partial vertical sectional view through the gauge of the present invention showing the gauge withdrawn from the tank preparatory to taking a measurement of the liquid content of the tank.

Referring to the drawings, and in particular to FIGURE 1, there is shown the gauge of the present invention as comprising generally of a mounting member 10 and a gauge tube assembly 12 for use in connection with the fuel tank 14 of an aircraft having liquid fuel 16 therein. The upper wall of the tank is designated by the numeral 18 and the numeral 20 designates the lower wall of the tank which is the bottom skin of an aircraft wing.

Referring to FIGURE 2, the lower wall 20 of the tank is shown as being provided with an opening 22. The mounting member 10 has an axial bore 24 and a coaxial threaded counterbore 26 therethrough, the counterbore 26 forming an annular seat 28. An annular groove 30 is provided in the wall of the bore 24 which is intersected by a plurality of circularly arranged, radially extending bores 32 through the mounting member 10, the purpose of which will hereinafter be more fully explained. Adjacent its lower end, the mounting member has a peripheral flange 34 which is adapted to be positioned against the upper surface of the lower wall 20 of the tank, with a sealing ring 36 interposed therebetween and the counterbore 26 surrounding the opening 22. The flange 34 has a series of circumferentially spaced holes which register with similar holes in the wall 20. The mounting member 10 is permanently secured in place against the wall 20 by means of screws, rivets, or other fastening means. As illustrated, the member 10 is attached to the wall 20 by means of sealed nuts 38 and screws 40, the heads of the screws being flush with the lower surface of the wall 20.

The gauge tube assembly 12 is shown as having a generally tubular shaped housing or casing which consists of an open-ended liquid measuring tube 42, an end member or plug 43 having an axial frusto-conically shaped orifice 44 therethrough, and a cap member 45. The tube 42 is preferably of fiber glass or like transparent material and is arranged for sliding movement within the bore 24 of the mounting member. Fluid sealing between the tube 42 and the mounting member 10 is effected by means of an annular resilient seal element 48 positioned in an appropriate groove 50 in the wall of bore 24. A plurality of circularly arranged, radially extending ports 52 are provided in the wall of tube 42 adjacent the lower end thereof. The tube 42 is further provided with appropriate graduation lines or indicia 54 which represent liquid measurement of any desired units as, for example, in gallons. The indicia is graduated and numbered in accordance with the particular tank to be used.

The cap member 45 has a skirt portion 56 which is adapted to receive the lower end of the tube 42 for attachment therein, as by bonding, to effect closure of the tube at its lower end. The skirt portion 56 is externally threaded for mutually cooperating with the threaded counterbore 26 to releasably hold the housing in a fully inserted position within the tank 14, as shown in FIGURE 2. To this end the cap member 45 is provided with sockets 58 by which it can be screwed into the counterbore 26 until the upper end of the skirt portion 56 abuts the seat 28, or removed from the mounting member 10 by the use of an appropriate tool such as a spanner wrench (not shown). When the cap member 45 is screwed up completely into the counterbore 26 of the mounting member, the lower surface 60 of the cap member lies flush with the lower surface 61 of the wall 20 of the aircraft wing to maintain the smooth contour of the wing, and the housing in a fully inserted position within the tank. In this fully inserted position, the ports 52 cooperate with the ports 32 and the groove 30 to effect a fluid path permitting flow of the liquid 16 from the tank 14 to the interior of the housing.

The cap member 45 is also provided with a cylindrically shaped, integral boss portion 62 which is arranged to extend upwardly into the tube 42 when the tube is secured into the skirt portion 56, as shown, the purpose of which will be hereinafter more fully explained. Positioned through the boss portion 62 and the cap member 45, in coaxial alignment with the orifice 44, are a bore 64 and a threaded counterbore 66 which serve to carry an actuatable valve assembly generally designated by the numeral 68.

The valve assembly 68 consists of a disc 70, an annular resilient element 72, a valve stem 76, a spacer tube 78, valve member 80, washer 82, and threaded nut 84.

The disc 70, which is adapted to be positioned for sliding movement within the tube 42, has upper and lower surfaces 86 and 88, axial bore 90, a plurality of circularly arranged apertures 92, and a peripheral groove 94 adapted to carry the resilient element 72. The resilient element 72 is provided with a cross-sectional diameter sufficiently large to obstruct the ports 52 when positioned oppositely thereof.

The valve stem 76 is shown as having an intermediate portion 96 positioned in the bore 64 for axial movement therein. Fluid sealing between the portion 96 and the boss portion 62 is accomplished by the provision of an annular resilient seal element 98 positioned in an appropriate groove in the wall of bore 64. A threaded lower end 100 of the stem is adapted to engage the threaded counterbore 66 to position the valve stem through the bore 90 of the disc 70 and the threaded upper end 102 of the stem through the orifice 44 such that the lower surface 104 is flush with the surface 60 of cap member 45 when the threaded end 100 and the counterbore 66 are fully engaged, as shown in FIGURE 2. The lower end 100 of the stem is provided with a slot 106 by which the stem can be rotated to advance it upwardly or downwardly by the use of a tool such as a screw driver (not shown).

The spacer tube 78 is adapted to be slipped on the valve stem 76 such that its lower end abuts the upper surface 86 of the disc 70. The upper end of the spacer tube 78 carries a flange portion 108 which serves as a support for the valve member 80. The valve member 80 is preferably fashioned from neoprene, or the like, and is generally frusto-conically shaped so as to conform to the orifice 44 in which it is adapted to seat. The valve member is axially bored and positioned on the end of the valve stem 76 such that its lower end abuts the flange 108 and is secured by means of the washer 82 and the nut 84 which is adapted to engage the threaded upper end of the valve stem.

An important feature of the present invention is that the valve member 80 and the disc 70, which carries the resilient element 72, be so spaced along the stem 76 as to normally position the valve member and the resilient element to maintain the orifice 44 and the ports 52 open when the valve stem is in the fully inserted position shown in FIGURE 2, and to close or obstruct the orifice and the ports simultaneously when the valve stem is moved to the position shown in FIGURE 3.

Means in the form of a retaining ring 110, positioned in a suitable groove 112 in the plug 43 to extend beyond the surface of the tube 42, is adapted to cooperate with the mounting member 10, and serves to arrest the housing in a fully retracted position when it is released and downwardly withdrawn, as shown in FIGURE 3.

Assume that the gauge of the present invention has been positioned within the tank 14, as indicated in FIGURES 1 and 2. If a predetermined quantity of liquid fuel 16 is introduced into the tank 14, the level of liquid rises within the gauge tube assembly 12, the liquid first entering the assembly through the ports 32, groove 30, and ports 52, and subsequently finding access to the upper portion of the assembly through the apertures 92 of the disc 70. Eventually the level of liquid within the assembly reaches the same height as the predetermined quantity of liquid fuel introduced into the tank 14. On the other hand, suppose that a portion of the liquid fuel 16 is depleted from the tank as by consumption thereof by the propulsion system of the aircraft, any change in the level of liquid within the tank produces a corresponding change in the level of liquid within the gauge tube assembly.

Assume now that it is desired to measure the quantity of liquid fuel within the tank 14. An appropriate tool, such as the hereinbefore mentioned screw driver (not shown), is positioned into the slot 100 and the valve stem 76 rotated to advance the valve assembly downwardly until movement thereof is limited by engagement of the lower surface 88 of the disc 70 with the boss portion 62, as shown in FIGURE 3. It is to be noted that in this position of the valve assembly, the resilient element 72 carried by the disc 70 obstructs the ports 52 and serves to effect closing of the fluid path as defined by these ports 52, the groove 30, and ports 32. Simultaneously with the obstruction of the ports 52 by the resilient element 72, the valve member 80 enters the orifice 44 and seats therein to effect closing of the orifice. Next, an appropriate spanner wrench (not shown) is inserted into the sockets 58 and the cap member 45 rotated to provide release thereof from the mounting member 10, thus allowing the gauge tube assembly to be withdrawn from the tank 14 to a position wherein the retaining ring 110 engages the mounting member, as shown in FIGURE 3. In this position of the assembly 12, the level of liquid within the tube 42, as measured by the graduations 54, provides a measure of liquid quantity in the tank 14. After the measurement is made, the gauge tube assembly 12 is slid back into the tank 14 to its normally fully inserted position and secured therein by rotation of the cap member 45. The valve stem 76 is also rotated in a direction to advance the valve assembly 12 upwardly to position the disc 70 and the valve member 80, as shown in FIGURE 3, and to normally maintain the ports 52 and the orifice 44 open.

It will be apparent that various parts of the gauge of the present invention can be fashioned from any number of lightweight materials, such as plastic materials. While plastic materials may be used with advantage, it is preferred that the several parts, with the exception of the tube 42, be fashioned from aluminum, such material having the advantage of being light in weight and corrosion resistant, which is of extreme importance, particularly if the gauge of the present invention is utilized in an aircraft fuel tank.

From the foregoing description, it will be appreciated that the present invention is capable of providing easy measurement of a quantity of liquid in a container or tank from the underside thereof. It will also be appreciated that this measurement can be accomplished quickly without the loss of liquid from the container.

Although a specific embodiment of the present invention has been described and illustrated in detail, it is to be clearly understood that the same is by way of illustration and example only; it is to be understood that the invention is not limited thereto, as many variations will be readily apparent to those versed in the art and the invention is to be given its broadest possible interpretation within the terms of the appended claims.

What I claim is:

1. A gauge for determining the liquid level in a container having a lower wall with an opening comprising a mounting member having a bore and adapted to be secured on the inside of the lower wall with said bore in axial alignment with the opening, a tubular housing having an orifice in its upper end and positioned for axial movement within said bore, mutually engaging means on said mounting member and said housing for releasably holding said housing in a normally fully inserted position within the container and lower surface of said housing in alignment with the lower surface of said wall, means carried by said housing and cooperable with said mounting member for arresting said housing in a fully retracted position when said housing is released and downwardly withdrawn, mutually cooperating fluid passage means carried by said mounting member and said housing for effecting a fluid path adjacent the lower end of said housing to allow liquid to flow from the container into said housing when said housing is in said fully inserted position, and actuatable valve means carried by said housing for normally maintaining said orifice and said path open to permit liquid to flow into said housing to attain a level equal to the level of liquid in the container and for closing said orifice and said path prior to withdrawal of said housing to said fully retracted position to contain liquid in said housing, whereby the level of liquid contained in said housing in said retracted position provides a measure of liquid level in the container.

2. A gauge for determining the liquid level in a container having a lower wall with an opening comprising a mounting member having a bore and adapted to be secured on the inside of the lower wall with said bore in axial alignment with the opening, an open-ended liquid level measuring tube positioned for axial movement within said bore, closure means on the lower end of said tube, an end member having an orifice in the upper end of said tube, mutually engaging means on said mounting member and said closure means for releasably holding said tube in a normally fully inserted position within the container and the lower surface of said closure means in alignment with the lower surface of said wall, means carried by said end member and cooperable with said mounting member for arresting said tube in a fully retracted position when said tube is released and downwardly withdrawn, mutually cooperating fluid passage means carried by said mounting member and said tube for effecting a fluid path adjacent the lower end of said tube to allow liquid to flow from the container into said tube when said tube is in said fully inserted position, and actuatable valve means carried by said closure means for normally maintaining said orifice and said path open to permit liquid to flow into said tube to attain a level equal to the level of liquid in the container and for closing said orifice and said path prior to withdrawal of said tube to said fully retracted position to contain liquid in said tube, whereby the level of liquid contained in said tube in said retracted position provides a measure of liquid level in the container.

3. A gauge for determining the liquid level in a container having a lower wall with an opening comprising a mounting member having a bore and adapted to be secured on the inside of the lower wall with said bore in axial alignment with the opening, a transparent tube positioned for axial movement within said bore, indicia on said tube for indicating the level of liquid therein, closure means on the lower end of said tube, an end member having an orifice in the upper end of said tube, mutually engaging means on said mounting member and said closure means for releasably holding said tube in a normally fully inserted position within the container and the lower surface of said closure means in alignment with the lower surface of said wall, means carried by said orifice defining means and cooperable with said mounting member for arresting said tube in a fully retracted position when said tube is released and downwardly withdrawn, mutually cooperating fluid passage means carried by said mounting member and said tube for effecting a fluid path adjacent the lower end of said tube to allow liquid to flow from the container into said tube when said tube is in said fully inserted position, and actuatable valve means carried by said closure means for normally maintaining said orifice and said path open to permit liquid to flow into said tube to attain a level equal to the level of liquid in the container and for closing said orifice and said path prior to withdrawal of said tube to said fully retracted position to contain liquid in said tube, whereby the level of liquid contained in said tube in said retracted position as measured by said indicia provides a measure of liquid level in the container.

4. A gauge for determining the liquid level in a container having a lower wall with an opening comprising a mounting member having a bore and adapted to be secured on the inside of the lower wall with said bore in axial alignment with the opening, an open-ended liquid level measuring tube positioned for axial movement within said bore, closure means on the lower end of said tube, a plug member having an orifice in the upper end of said tube, mutually engaging means on said mounting member and said closure means for releasably holding said tube in a normally fully inserted position within the container and the lower surface of said closure means in alignment with the lower surface of said wall, means carried by said plug member and cooperable with said mounting member for arresting said tube in a fully retracted position when said tube is released and downwardly withdrawn, mutually cooperating fluid passage means carried by said mounting member and said tube for effecting a fluid path adjacent the lower end of said tube to allow liquid to flow from the container into said tube when said tube is in said fully inserted position, and actuatable valve means carried by said closure means for normally maintaining said orifice and said path open to permit liquid to flow into said tube to attain a level equal to the level of liquid in the container and for closing said orifice and said path prior to withdrawal of said tube to said fully retracted position to contain liquid in said tube, whereby the level of liquid contained in said tube in said retracted position provides a measure of liquid level in the container.

5. A gauge assembly as set forth in claim 4 wherein said means for arresting said tube in a fully retracted position comprises a retaining ring positioned in a peripheral groove in said plug member to extend beyond the outer surface of said tube.

6. A gauge for determining the liquid level in a container having a lower wall with an opening comprising a mounting member having a bore and a threaded counterbore, said mounting member being adapted to be secured on the inside of the lower wall with said bore in axial alignment with the opening and said counterbore surrounding said opening, a tube positioned for axial movement within said bore, a cap member on the lower end of said tube, external threads on said cap member in engagement with said threaded counterbore to position said tube in a fully inserted position within the container and the lower surface of said cap member in alignment with the lower surface of the wall, a plug member with an orifice in the upper end of said tube, means carried by said plug member and cooperable with said mounting member for arresting said tube in a fully retracted position when said tube is released and downwardly withdrawn, mutually cooperating fluid passage means carried by said mounting member and said tube for effecting a fluid path adjacent the lower end of said tube to allow liquid to flow from the container in to said tube when said tube is in said fully inserted position, and actuatable valve means carried by said closure means for normally maintaining said orifice and said path open to permit liquid to flow into said tube to attain a level equal to the level of liquid in the container and for closing said orifice and said path prior to withdrawal of said tube to said fully retracted position to contain liquid in said tube, whereby the level of liquid contained in said tube in said retracted position provides a measure of liquid level in the container.

7. A gauge for determining the liquid level in a container having a lower wall with an opening comprising a mounting member having a bore, a peripheral groove in the wall of said bore, said mounting member being adapted to be secured on the inside of the lower wall with said bore in axial alignment with the opening, a tubular housing having an orifice in its upper end and positioned for axial movement within said bore, mutually engaging means on said mounting member and said housing for releasably holding said housing in a normally fully inserted position within the container and the lower surface of said housing in alignment with the lower surface of said lower wall, means carried by said housing and cooperable with said mounting member for arresting said housing in a fully retracted position when said housing is released and downwardly withdrawn, at least one radially extending port through said mounting member to intersect said groove, at least one port through said housing adjacent its lower end to intersect said groove when said housing is in said fully inserted position, and actuatable valve means carried by said housing for normally maintaining said orifice and said housing port open to permit liquid flow through said mounting and housing ports into said housing to attain a level equal to the level of liquid in the container and for closing said orifice and housing prior to withdrawal of said housing to said fully retracted position to contain liquid in said housing, whereby the level of liquid contained in said housing in said retracted position provides a measure of liquid level in the container.

8. A gauge for determining the liquid level in a container having a lower wall with an opening comprising a mounting member having a bore and a threaded counterbore, said mounting member being adapted to be secured on the inside of the lower wall with said bore in axial alignment with the opening and said counterbore surrounding said opening, a tube positioned for axial movement within said bore, a cap member on the lower end of said tube, external threads on said cap member in engagement with said threaded counterbore to position said tube in a fully inserted position within the container and the lower surface of said cap member in alignment with the lower surface of the wall, a plug member with an orifice in the upper end of said tube, means carried by said plug member and cooperable with said mounting member for arresting said tube in a fully retracted position when said tube is released and downwardly withdrawn, mutually cooperating fluid passage means carried by said mounting member and said tube for effecting a fluid path adjacent the lower end of said tube to allow liquid to flow from the container into said tube when said tube is in said fully inserted position, a boss portion integral with said cap member and positioned to extend within said tube, a bore in said boss portion in axial alignment with said orifice, a threaded counterbore in said cap member and boss portion, a valve stem positioned for axial movement within said bore, external threads on said valve stem in engagement with said threaded counterbore for holding said valve stem in a fully inserted position within said tube with its upper end projecting through said orifice and the lower surface of its lower end in alignment with the lower surface of said cap member when said tube is in said fully inserted position within the container, a valve member carried by the upper end of said valve stem, an apertured disc carried by said valve stem and positioned within said tube for sliding movement therein, said valve member and said disc being so spaced along valve stem as to normally maintain said orifice and said path open when said valve stem is in said fully inserted position and to close said orifice and said path simultaneously when said valve stem is moved downwardly to effect engagement of said disc and said boss portion prior to withdrawal of said tube to said fully retracted position, whereby the level of liquid contained in said tube in said retracted position provides a measure of liquid level in the container.

References Cited in the file of this patent

UNITED STATES PATENTS

| | | |
|---|---|---|
| 2,614,426 | Darlington | Oct. 21, 1952 |
| 2,621,520 | Redin et al. | Dec. 16, 1952 |
| 2,949,776 | Field et al. | Aug. 23, 1960 |

FOREIGN PATENTS

| | | |
|---|---|---|
| 649,607 | Great Britain | Jan. 31, 1951 |